Feb. 14, 1933.   H. H. TIMIAN   1,897,540
ENGINE
Filed March 2, 1931
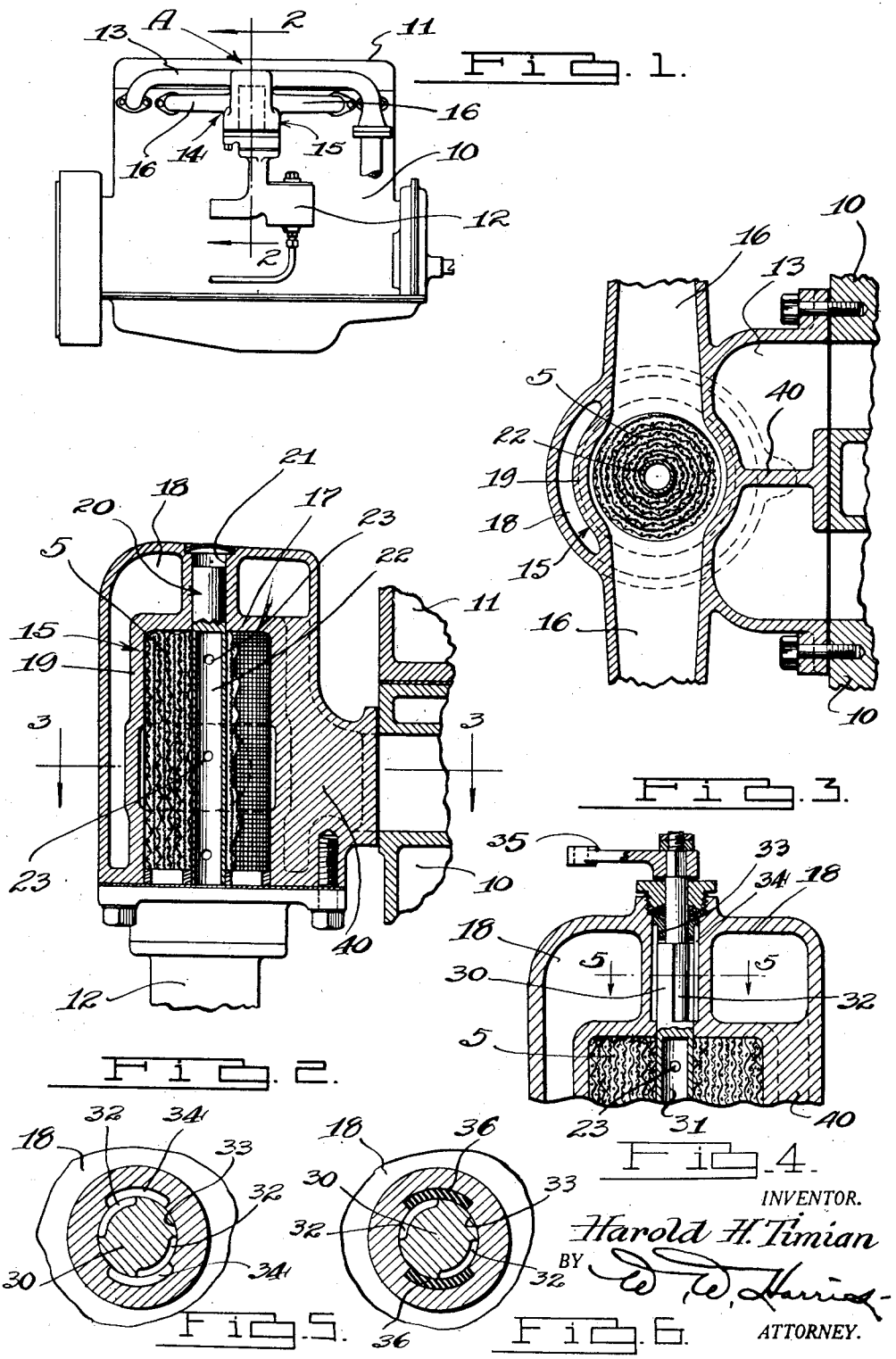
INVENTOR.
Harold H. Timian
BY
ATTORNEY.

Patented Feb. 14, 1933

1,897,540

UNITED STATES PATENT OFFICE

HAROLD H. TIMIAN, OF DETROIT, MICHIGAN, ASSIGNOR TO CONTINENTAL MOTORS CORPORATION. OF DETROIT, MICHIGAN, A CORPORATION OF VIRGINIA

ENGINE

Application filed March 2, 1931. Serial No. 519,634.

My invention relates to internal combustion engines and more particularly to the fuel mixture supply and means for preparing the mixture for combustion.

An object of my invention is to improve the economy and general performance of internal combustion engines by providing means for improving the fuel mixture characteristics of such engines.

Another object of my invention is to improve the engine efficiency by providing improved means for uniformly heating the fuel mixture.

A further object of my invention is to construct a manifold structure having generally improved heat transfer means for heating the intake fuel means.

For a more detailed understanding of my invention reference may be had to the accompanying drawing illustrating preferred embodiments of my invention, and in which:

Figure 1 is a side elevational view of an internal combustion engine showing a manifold structure assembled therewith which is constructed in accordance with my invention, Figure 2 is a vertical sectional view through the manifold and a portion of the engine taken on the line 2—2 of Figure 1, Figure 3 is a fragmentary horizontal sectional view through a portion of the manifold structure and taken on the line 3—3 of Figure 2, Figure 4 is a fragmentary sectional view of a portion of an intake manifold illustrating a modified construction, Figure 5 is a detail sectional view taken on the line 5—5 of Figure 6, and Figure 6 is a similar detail sectional view of a modified construction.

In the accompanying drawing I have illustrated my invention with an internal combustion engine, which in general includes a cylinder block 10, a cylinder head 11 secured to said block by any suitable means and a fuel mixture forming device or carburetor 12. Associated with said engine and including a heating device for the fuel mixture is a manifold structure A which comprises an exhaust manifold portion 13 and an intake manifold portion 14. The intake manifold is provided with a riser 15 arranged in open communication with the fuel mixture forming device or carburetor 12, the incoming fuel mixture conducted through said riser and distributed into the lateral intake header 16. Although the illustrated embodiment of my invention shows a carburetor located below the intake manifold, it will be understood that my device may be associated with a manifold structure which is adapted for connection with a down-draft carburetor. Elsewhere in the specification and in the claims where I specify a riser it will be understood that the term is applied to a fuel mixture conducting means connecting the manifold header with a carburetor of either the type as shown in the accompanying drawing or the down draft type.

The incoming fuel mixture flows into the riser 15 and is turned substantially through an angle of approximately 90° and conducted through the lateral header portions 16 to the engine cylinders, any suitable branch portions being utilized for connecting the header with the intake ports of the cylinder. I have provided a fuel mixture diffusing device or core 5 which may be inserted within the riser 15, this fuel mixture diffusing device being constructed in general substantially similar to the fuel mixing diffusing device shown and claimed in my copending application, Serial No. 511,172 filed January 26, 1931 in general this core consists of a spirally wound mesh composed preferably of a copper mesh suitably reinforced with a steel wire mesh. The upper portion of this core is arranged to be tightly brought into contact with the upper wall 17 of the riser 15 in order to provide a proper contact between the manifold and core for the transfer of heat by conduction from the heating jacket 18 surrounding the riser portion 15. Preferably this heating jacket extends around the periphery of the vertical cylindrical riser wall 19 as well as said top wall 17. The fuel mixture percolates through this core by capillary action thereby breaking up the heavier fuel particles and thoroughly vaporizing the mixture. It will be noted that this core is a porous device and a good conductor of heat, thereby serving to conduct the heat to the central portion of the core.

In order to better apply heat to the central portion of the porous core, I have provided a non-porous heat conducting element 20 which is arranged to extend substantially axially through the central portion of this porous fuel mixture diffusing device or core. This heat conducting element is preferably fitted very tightly within the hole 21 formed in the manifold structure and the upper portion of this heat conducting element 20 is thus positioned in close proximity to the exhaust gases circulating through the heat jacket 18 which surrounds the riser portion 15. Thus the heat from the exhaust gases is transferred by conduction to the heat conducting element 20. That portion of the heat conducting element 20 which extends through the fuel mixture diffusing device or core 5 is preferably constructed tubular in shape as shown at 22, said tubular portion being preferably provided with a plurality of openings 23 and the interior of this tubular portion is preferably arranged in open communication with the fuel mixture forming device or carburetor 12. Thus some of the fuel is free to flow within the tubular portion 22 and through the openings 23 into the porous fuel diffusing device 5. Since the upper solid portion of the heat conducting element 20 and the tubular portion 22 are preferably constructed of one piece, or otherwise united or secured together, the heat is thus readily conducted to the central portion of the fuel mixture diffusing device or core 5 for applying heat to the central portion of said core.

If desired, regulable means may be provided for controlling the amount of heat applied to the central portion of the fuel mixture diffusing device or core through the agency of the heat conducting element extending within said core. One means by which a regulable control is accomplished is by providing means for varying the area of contact between the heat conducting element and the manifold portion which carries said element and is subjected to the heat of the exhaust gases circulating through the heater jacket 18.

Figures 4 to 6 inclusive illustrate an embodiment of such a regulable control device and to show a heat conducting element 30 which carries a tubular portion 31 constructed similarly to the tubular portion 22 of element 20. The upper portion of the heat conducting element 30 is provided with one or more segmental recessed portions 32 and the bore 33 in the manifold which receives this heat conducting element 30 is also provided with one or more recessed portions 34. The bore 33 and the element 30 are thus provided with surface portions intermediate the recessed portions 34 and 32 respectively which may be arranged in contacting relation for conducting the heat from the exhaust gases in the heater jacket 18 to the element 30 which extends within the porous fuel mixture diffusing device 5. An arm 35 or other suitable device is preferably fixed to the end of the element 30 and is adapted for manual or automatic operation to rotate the element 30 within the bore 33 to thereby vary the contacting surface area between the bore and element 30. Figure 5 shows the contacting surface area approximately reduced in half and it will be noted that an increase in this contacting area will increase the amount of heat permitted to be transferred to the heat conducting element 30. A decrease in this contacting surface area will decrease the amount of heat permitted to be transferred to the heat conducting element 30. It will thus be noted that I have provided a simple regulable means for controlling the amount of heat permitted to be transferred from the manifold which is subjected to the heat of the exhaust gases to the heat conducting element 30.

In Figure 6 I have shown a modified construction in which the manifold is provided with inserts 36 of insulating material and the contacting surface area between the bore 33 in the manifold and the element 30 is thus varied in the manner as described above.

A further feature of my invention resides in the manifold construction which facilitates the conduction of heat from the exhaust gases in the exhaust manifold to an inner wall of the heater jacket. This is accomplished by providing a web or partition wall 40 within the exhaust manifold, said web being subjected to the heat of the exhaust gases. It will be noted that the web is formed integral with the inner wall 19 of the heater jacket and thus heat from the exhaust gases is transferred by conduction to the inner wall of said heater jacket as well as by direct contact of the exhaust gases which are circulated within said heater jacket.

It will be apparent to those skilled in the art to which my invention pertains that various modifications and changes may be made therein without departing from the spirit of my invention or from the scope of the appended claims.

What I claim as my invention is:

1. In combination with an internal combustion engine and a fuel mixture forming device, means for conducting said mixture to said engine, and means for applying heat substantially uniformly to the fuel mixture in said conducting means and including a porous heat conducting device within said conducting means, and a heat conducting fuel mixture conducting element within said porous heat conducting device.

2. In combination with an internal combustion engine and a fuel mixture forming device, means for conducting said mixture to said engine, and means for applying heat substantially uniformly to the fuel mixture in said conducting means and including a porous heat conducting device within said conducting means, and a non-porous fuel mixture and heat conducting element within said porous heat conducting device.

3. In combination with an internal combustion engine and a fuel mixture forming device, means for conducting said mixture to said engine, and means for applying heat substantially uniformly to the fuel mixture in said conducting means and including a porous heat conducting device within said conducting means located adjacent the fuel mixing forming device and a fuel mixture and heat conducting element within said porous heat conducting device.

4. In combination with an internal combustion engine and a fuel mixture forming device, means for conducting said mixture to said engine, means for applying heat substantially uniformly to the fuel mixture in said conducting means and including a porous heat conducting device within said conducting means, and means for applying heat to a portion of said porous device and including a fuel mixture and heat conducting element located within said porous device.

5. In combination with an internal combustion engine and a fuel mixture forming device, means for conducting said mixture to said engine, means for applying heat substantially uniformly to the fuel mixture in said conducting means and including a porous heat conducting device within said conducting means, and means for applying heat to the central portion of said porous device and including a fuel mixture and heat conducting element within said porous device and extending axially therethrough.

6. In combination with an internal combustion engine and a fuel mixture forming device, means for conducting said mixture to said engine, means for applying heat substantially uniformly to the fuel mixture in said conducting means and including a porous heat conducting device within said conducting means, and means for applying heat to the central portion of said porous device and including a perforated tubular heat conducting element communicating with said fuel mixture forming device and extending longitudinally through said porous device.

7. In combination with an internal combustion engine having an exhaust manifold and a fuel mixture forming device, means for conducting said mixture to said engine, and means for applying heat substantially uniformly to the fuel mixture in said conducting means and including a porous fuel mixture diffusing device disposed within said conducting means and a fuel mixture conducting heat element arranged in heat conductive relation with the exhaust gases in said exhaust manifold.

8. In combination with an internal combustion engine having an exhaust manifold and a fuel mixture forming device, means for conducting said mixture to said engine, and means for applying heat substantially uniformly to the fuel mixture in said conducting means and including a porous fuel mixture diffusing device disposed within said conducting means and a perforated heat conducting element located within said diffusing device, said element arranged in communication with said fuel mixing forming means and in heat conductive relation with the exhaust gases in said exhaust manifold.

9. In an engine having a fuel mixture forming device and a manifold intermediate said device and engine, a fuel mixture diffusing device within said manifold, and a fuel mixture and heat conducting element within said fuel mixture diffusing device, said diffusing device adapted to receive heat by conduction from a wall of the manifold and from said element.

10. In an engine having a fuel mixture forming device and a manifold intermediate said device and engine, a fuel mixture diffusing device within said manifold, and a fuel mixture and heat conducting element arranged in heat conductive relation with said manifold and extended within said fuel mixture diffusing device, said diffusing device adapted to receive heat from a wall of the manifold and from said element.

11. In an engine having a fuel mixture forming device and a manifold intermediate said device and engine, a fuel mixture diffusing device within said manifold, a heated fuel mixture conducting element extending substantially axially through said fuel mixture diffusing device, said diffusing device adapted to receive heat from a wall of the manifold and from said element.

12. In an engine having a carburetor and a manifold intermediate the carburetor and engine, said manifold having a substantially vertical portion opening to the carburetor and distributing portions extending laterally therefrom, a fuel mixture diffusing core located within said vertical manifold portion and extending across said distributing portions, and a heat conducting element positioned in a portion of said core.

13. In an engine having a fuel mixture forming device and a manifold intermediate the fuel mixture forming device and engine, a porous fuel mixture diffusing device within said manifold, and a perforated tubular means communicating with the fuel mixture forming device for applying heat to a central portion of said diffusing device.

14. In an engine having a fuel mixture forming device and a manifold intermediate the fuel mixture forming device and engine, a porous fuel mixture diffusing device within said manifold, and means communicating with said fuel mixture forming device and extended within said diffusing device for applying heat to a central portion thereof.

15. In an engine having a fuel mixture forming device and a manifold intermediate the fuel mixture forming device and engine, a porous fuel mixture diffusing device within said manifold, and fuel mixture conducting means communicating with the fuel mixture forming device carried by said manifold and extending substantially axially within said fuel mixture diffusing device for applying heat to a central portion thereof.

16. In an engine having a fuel mixture forming device and a manifold intermediate the fuel mixture forming device and engine, a porous fuel mixture diffusing device within said manifold, and regulable means for applying heat by conduction to a central portion of said diffusing device.

17. In combination with an internal combustion engine having an exhaust manifold and a fuel mixture forming device, means for conducting said mixture to said engine, and means for applying heat substantially uniformly to the fuel mixture in said conducting means and including a porous fuel mixture diffusing device disposed within said conducting means and a heat element arranged in heat conductive relation with the exhaust gases in said exhaust manifold, and regulable means controlling the transfer of heat from said exhaust gases to said element.

In testimony whereof I affix my signature.

HAROLD H. TIMIAN.